Oct. 27, 1925.

J. W. COCHRAN 1,559,313

COMBINED HOLDER AND TOOL

Filed Jan. 21, 1925     3 Sheets-Sheet 1

John W. Cochran
INVENTOR

BY Victor J. Evans
ATTORNEY

WITNESS:
R. E. Wise.

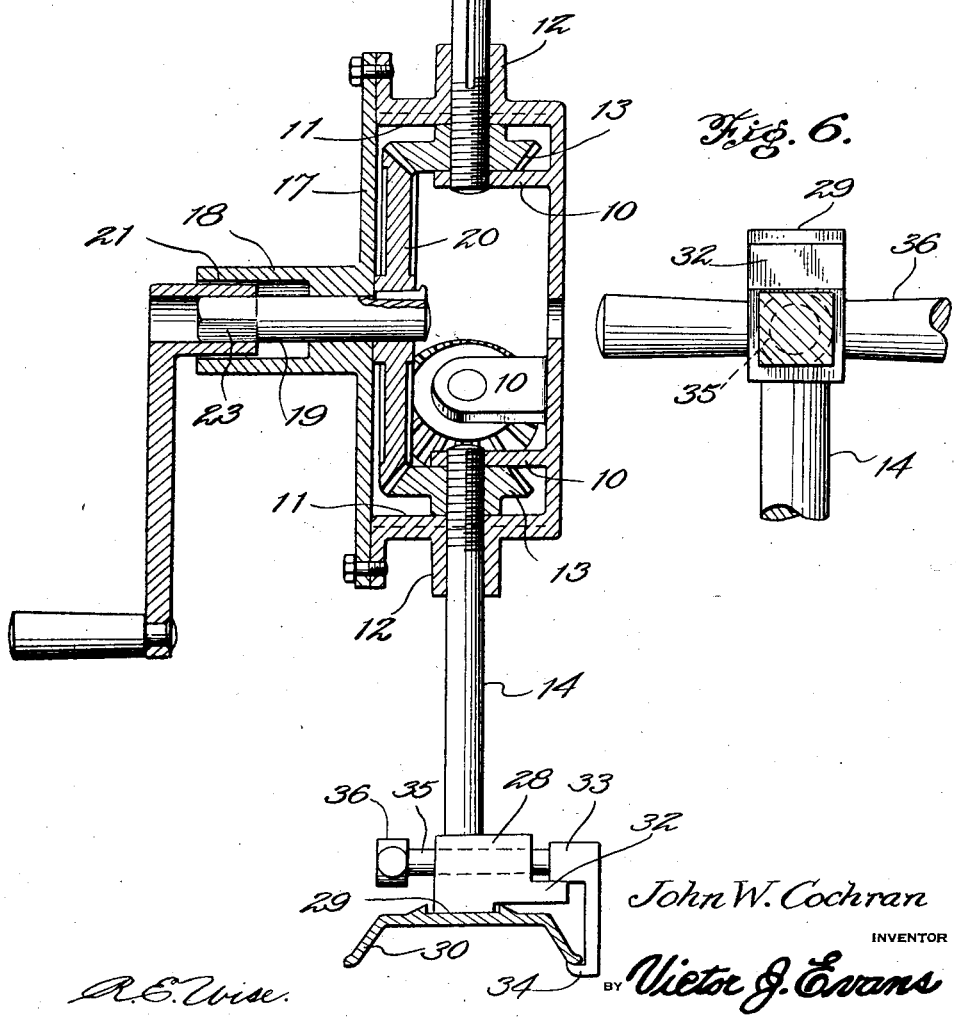

Oct. 27, 1925.
J. W. COCHRAN
1,559,313
COMBINED HOLDER AND TOOL
Filed Jan. 21, 1925   3 Sheets-Sheet 3
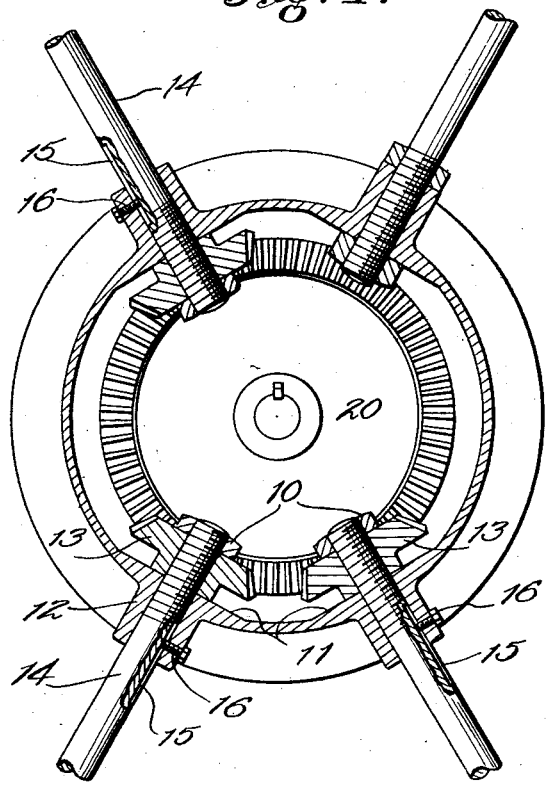
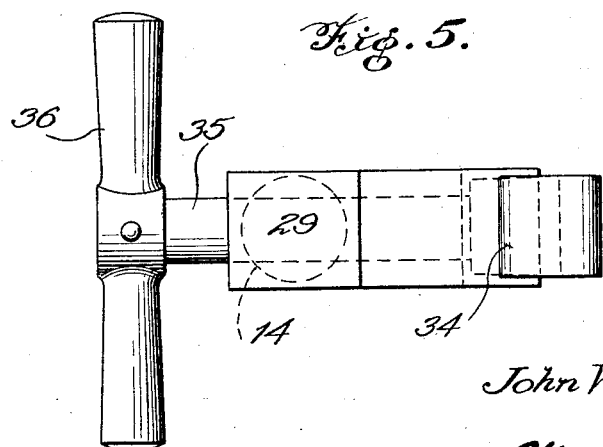

Patented Oct. 27, 1925.

1,559,313

UNITED STATES PATENT OFFICE.

JOHN W. COCHRAN, OF MILLINOCKET, MAINE.

COMBINED HOLDER AND TOOL.

Application filed January 21, 1925. Serial No. 3,872.

To all whom it may concern:

Be it known that I, JOHN W. COCHRAN, a citizen of the United States, residing at Millinocket, in the county of Penobscot and State of Maine, have invented new and useful Improvements in Combined Holders and Tools, of which the following is a specification.

The object of this invention is the provision of a combined spare tire holder and tire rim expanders for automobiles.

A further object is the provision of a device of this character which is removably fixed to the rear or other suitable portion of an automobile, but designed to be locked thereon to serve as a holder for a spare tire, and which either when removed from the machine or sustained thereon may be also employed for expanding or contracting the rims of pneumatic tires.

A further object is the production of a device for this purpose which includes a casing removably supported upon an automobile and having arms radiating therefrom and provided with means for contacting engagement with the rim on which a spare tire is supported, means being provided for simultaneously imparting a longitudinal movement to the arms in both directions, whereby to hold the arms in positions to effectively support the spare tire thereon, or to act upon the rim of the spare tire to expand or contract the rim when a tire is to be removed therefrom or secured thereon.

To the attainment of the above broadly stated objects and others which will appear as the nature of the invention is better understood, reference is to be had to the drawings which accompany and which form part of this application.

In the drawings:—

Figure 3 is a sectional view on an enlarged scale and approximately on the line 3—3 of Figure 1.

Figure 4 is a sectional view on the line 4—4 of Figure 2.

Figure 5 is a plan view of one of the movable arms of the improvement and the rim engaging jaw carried thereby.

Figure 6 is a sectional view on the line 6—6 of Figure 3.

Figure 1:
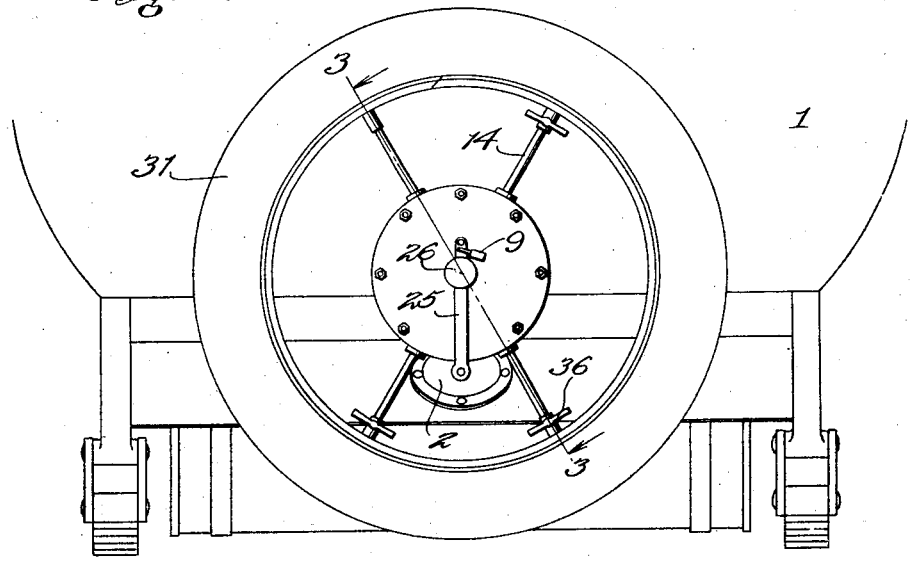
Figure 1 is a rear elevation of a sufficient portion of an automobile to illustrate the application of my improvement thereon.

Firmly riveted or otherwise secured, preferably on the rear of an automobile 1 there is a support 2. The support is preferably arranged at an outward angle with respect to the automobile, and carries at its outer end a head portion 3 whose outer face is flanged, as at 4 and which is provided with a central opening.

The numeral 5 designates a cylindrical casing having its outer open face flanged. A bolt member 6 passes centrally through the rear of the casing and through the opening in the head of the support 2. This bolt, at the portion thereof passing through the casing is preferably square to prevent the free turning of the casing on the bolt. The bolt is engaged by a nut member 7 having outstanding angularly arranged handle portions 8 whereby the bolt may frictionally contact with the inner face of the head 3 of the support 2. The bolt is provided with an opening to receive therethrough the shackle of a lock 9.

The cylindrical housing, at points equidistant from the vertical center thereof, is provided on its upper and lower faces with inner housings provided preferably by flanges 10 which project from the closed rear wall of the casing 5. The inner walls of the housings are formed by straight walls 11 on the inner periphery of the casing 5. The casing, in a line with the housings, is formed with outstanding bosses 12. Each of the housings is designed to freely receive therein a gear 13, the outer straight face of which contacting with the flanges 10 and the inner faces or hubs contacting with the walls 11. Such contact is only slight so as not to interfere with the free rotation of the gears. The housings have central openings therethrough, the said openings extending through the bosses 12 and the gears 13 have their bores threaded. The threaded bores of the gears are engaged by the threaded ends of cross sectionally rounded arms 14. These arms are, of course, passed through the openings in the hubs and in the housings. The arms are provided with elongated slots 15 in which are received the ends of pins or bolts 16 carried by the respective bosses 12.

The open and flanged face of the casing 5 is closed by a disk plate 17 which is bolted or otherwise secured thereto. The plate 17 carries a central hub portion 18 through which there is centrally passed a shaft 19. This shaft has fixed on its inner end a gear 20 which is in mesh with the respective pinions 13. By turning the gear 20 it will be apparent that a like movement will be imparted to the gear so that the threaded arms 14 received through the threaded bores of the gears 13 will be influenced longitudinally. The turning of the arms is prevented by the pins or bolts 16.

Figure 2:
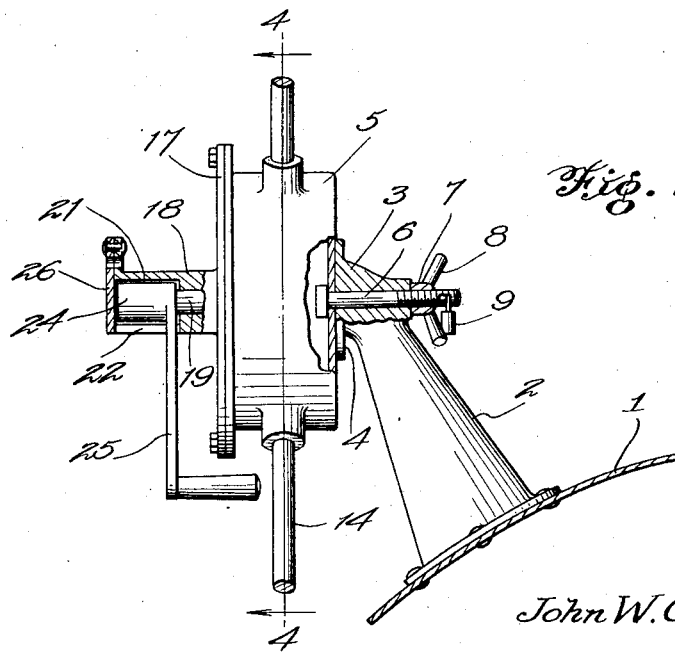
Figure 2 is a fragmentary side elevation thereof, with parts in section and parts broken away.

The hub 18, at the outer portion thereof, is provided with an enlarged bore or opening 21, the lower wall provided thereby being slotted, as at 22. The outer end of the shaft 19 is squared, as at 23, and this squared portion is designed to be engaged by the socket end 24 of a crank handle 25. The handle is employed for turning the shaft. When not in use the handle is reversely positioned on the squared end of the shaft and the socket end 24 thereof will be snugly received in the pocket provided by the enlarged opening 21 in the hub 18, as disclosed in Figures 1 and 2 of the drawings. The hub 18 has on its outer end an upstanding lug to which is pivoted a lug or offset formed on the periphery of a disk 26. The disk is designed to be swung over the hub to close the pocket 18 and the lugs on the disk and on the hub are provided with openings that are designed to align and to receive therethrough the shackle of a lock 27.

Each of the arms 14 is of an equal length and carries on its outer end a head block 28. Each block has its outer face formed with a lug extension 29 to be received in the central groove on the inner face of the rim 30 that carries the spare tire 31. It will be apparent that when the gear is operated to turn the pinions, the arms may be moved longitudinally in a direction outward with respect to the casing so that the lugs 29 will be firmly received in the groove of the rim 30 and thus effectively lock the spare tire on the carrier.

Each head block 28, in a line with the lug 29 is formed with an inwardly directed finger 32. Each of these fingers is designed for contacting engagement with an angle enlargement 33 formed on the lower end of a jaw member 34. The jaw members as disclosed in Figure 3 of the drawings are designed for engagement with the inner beaded edge of the rim 30. The flange 33 of each of the jaw carrying members 34 is provided with a rod extension 35 that passes through an opening in each of the head blocks 18. The rods 35 on their outer ends are provided with handles 36. It will be apparent that by grasping the handle and exerting an outward pull thereon the jaws may be arranged over the edge of the rim as disclosed in Figure 3. The jaws are only brought to this position when it is desired to contract the split rim 30. The split rim, after contraction, is expanded by the outward longitudinal movement of the arms 14 actuated as previously described.

The simplicity of my construction and its advantages will, it is thought be apparent to those skilled in the art to which such inventions relate. The improvement is necessarily susceptible to changes and modifications and therefore I am not to be restricted to the device as herein set forth and hold myself entitled to make such changes therefrom as fairly fall within the scope of what I claim.

Having described the invention, I claim:—

1. In combination with an automobile, of a combined spare tire carrier and rim expander therefor, comprising a support fixed on the automobile, a casing removably secured on the support, radially disposed arms movable in and projecting outward from the casing, a head block on each arm having a notch to engage the inner periphery of the spare tire carrying rim, rim engaging jaws having elements movable through the respective blocks, means between the jaws and blocks for holding the latter from swinging movement on the former, operating means for imparting a simultaneous longitudinal movement to the arms, actuating means for said operating means, and means for housing and locking the actuating means in inoperative position.

2. In combination with an automobile, of a combined spare tire support and rim expander therefor, including a support fixed on the automobile, a casing removably secured to the support, radially disposed housings in the casing, a pinion having a threaded bore in each housing, an arm having a threaded end received through the casing and housings and engaging the bores of the pinion, means holding the arms from turning, tire rim engaging blocks on the outer ends of the arms, tire engaging jaws slidably associated with the blocks, a gear in mesh with the pinion, a shaft therefor guided through a hub on the outer face of the casing, said hub having an enlarged bore providing a pocket, the lower wall of which being slotted and the outer end of the shaft being squared, a handle having a squared socket to engage the squared end of the shaft and designed to be reversely arranged thereon and to be received wholly in the pocket when in active position and when in such position to have its shank passed through the slot in the pocket, a swingable closure for the pocket, and means for locking the same in closed position.

In testimony whereof I affix my signature.

JOHN W. COCHRAN.